Figure 1:
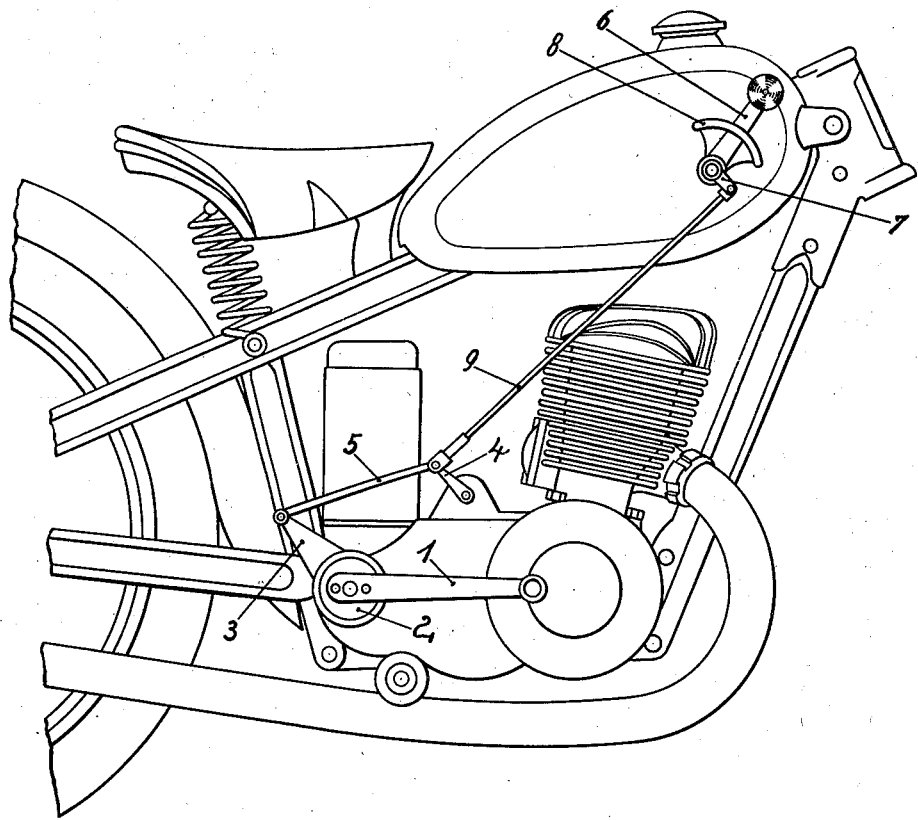

Sept. 28, 1937. H. WEBER 2,094,163
GEAR CONTROLLING MEANS FOR MOTORCYCLES
Filed Aug. 13, 1935 2 Sheets-Sheet 1

H. Weber
inventor

By: Glascock Downing & Seebold
Attys.

Sept. 28, 1937.  H. WEBER  2,094,163
GEAR CONTROLLING MEANS FOR MOTORCYCLES
Filed Aug. 13, 1935  2 Sheets—Sheet 2
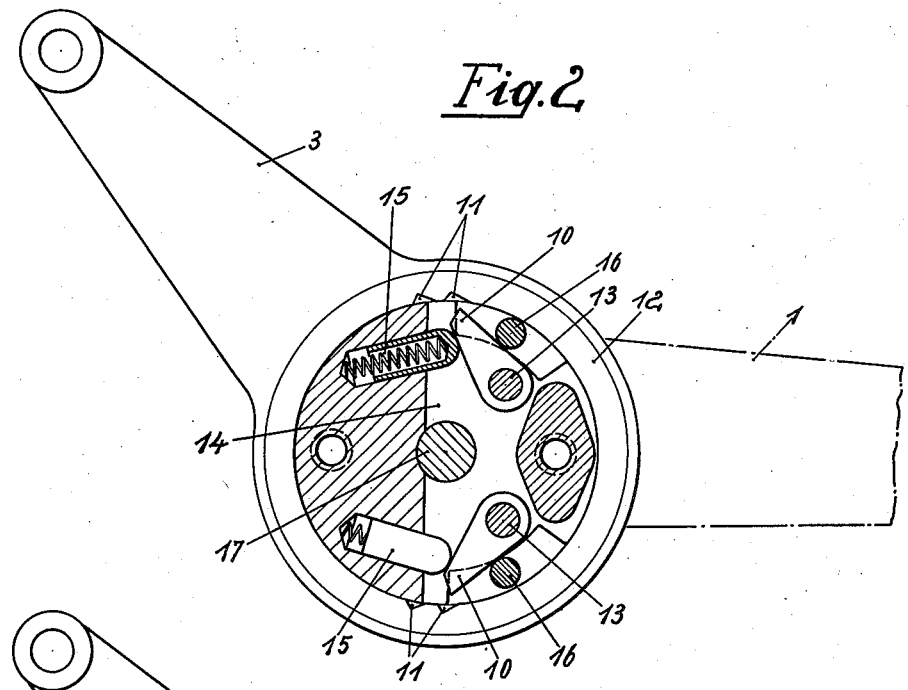
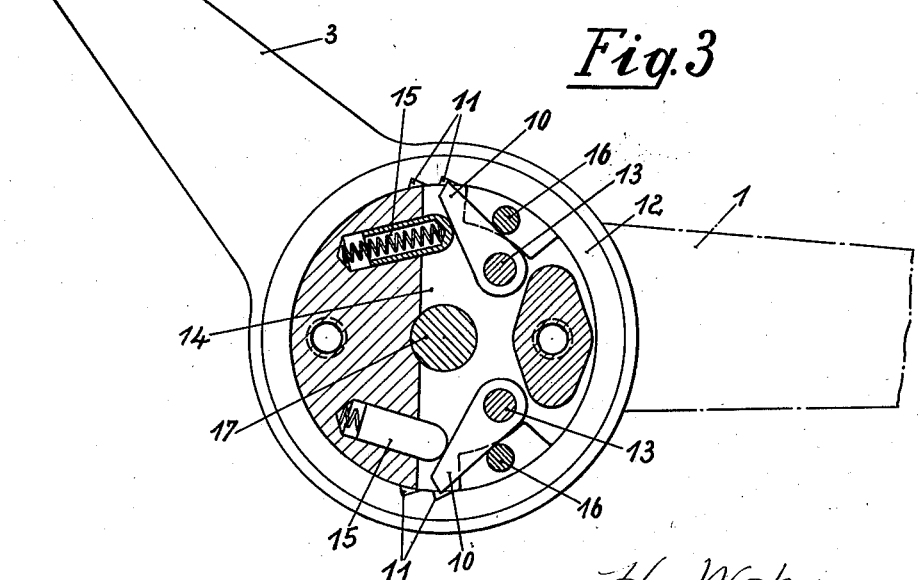

Patented Sept. 28, 1937

2,094,163

UNITED STATES PATENT OFFICE 2,094,163

GEAR CONTROLLING MEANS FOR MOTOR-CYCLES

Hermann Weber, Zschopau, Germany, assignor to Auto Union A-G., Chemnitz, Germany Application August 13, 1935, Serial No. 35,993
In Germany August 10, 1934

2 Claims. (Cl. 74—481)

The present invention relates to apparatus for controlling the speed of automotive vehicles and particularly pertains to improved means for shifting the gear ratio of motorcycles.

It is required of a control for automobile vehicles, more particularly motorcycles, whether it be a manual control or a foot control, that it should admit of being operated quickly and reliably. In the case of manual control the driver, when changing gear, has to let go of the steering member entirely with the right hand, while with the left hand he operates the clutch handle. The moment of changing gear is in such cases always a moment of insecurity.

For a long time past foot-operated controls have for this reason been employed for racing purposes and for cross-country sports. Their main advantage resides in the fact that it is possible for the driver to effect the change of gear without letting go of the steering member. The foot control, whether with one lever or with two levers, admits of being operated more reliably, more conveniently and more quickly than any other control. This is particularly noticeable when travelling around curves or on difficult roads, and in racing. Foot control, however, also presents disadvantages, for instance the speed can only be changed one stage by depressing the pedal. If it is desired for example to change back from the fourth speed to the first, for the purpose of braking for example when racing, it is necessary to operate the gear lever three times, which occupies a good deal of time. When starting it is difficult to ascertain whether a speed is put in at all, and if so, which speed, since the gear pedal always goes back into its position of rest. Moreover a tourist who does not use his machine very frequently will in many cases find the foot-operated control awkward, since he cannot see which speed is in operation. In travelling over trackless land, as for example in cross-country sports, it is frequently necessary to use both legs for catching up and supporting the machine, so that gear changing with the pedal is then impossible.

These disadvantages of foot-operated control are obviated by the present invention. For this purpose the foot-operated and manual-operated controls, known in themselves, are united, being connected for example by link-and-lever mechanism. The manual-operated gear lever is so coupled to the foot control that it indicates from time to time, upon a segment, known in itself, provided with speed indications, which speed has been selected by the foot-operated control.

It is preferable to employ a foot control of the kind in which, when actuating the control pedal, the transmission lever leading to the gear and the manual gear lever connected therewith are actuated, whereas the foot-operated control lever remains at rest when the manual-control lever is operated.

As a foot-operated control it is preferable to employ a ratchet lock, in which the pawls or make-and-break cams are not in mesh with the teeth of the control disc when the pedal is in a position of rest. If for example the driver is prevented, in cross-country sports, from using the foot control, he can use the manual-control lever. If the driver wishes to apply the brake, or to change from the fourth to the first speed, which takes rather a long time with pedal actuation, he uses the manual-control lever, with which he can pass directly in a single movement from the fourth speed to the first.

The invention is illustrated by way of example in the accompanying drawings, in which Figure 1 shows the arrangement of a combined foot-operated and manual-operated control in the case of a motorcycle, as seen from the side, and Figures 2 and 3 show the ratchet locking means of a foot-operated control in sectional elevation.

The foot-operated control pedal 1 actuates the ratchet locking means 2 with a transmission lever 3. The transmission lever 3 is connected with the rock lever 4 by a link 5. The manual control is constructed as a tank control and consists of a manual-control lever having long and short arms 6 and 7 and a control segment 8. The short arm 7 is coupled to the rock lever 4 by a link 9, whereby the positive connection of the foot-operated control with the manual control is obtained.

In Figure 2 is illustrated a ratchet locking means, such as is preferably employed with the present invention. The pawls or make-and-break cams 10, when the pedal lever 1 is in a position of rest, are out of engagement with the teeth 11 of a control disc 12, which is integral with the transmission lever 3. The pawls 10 are secured by means of pins 13 upon a control body 14. They are rotatable about the pins 13 and are loaded by springs 15. Stops 16 are stationary and serve for guiding the pawls. The control body 14 revolves about a stationary pivot 17. If the control pedal 1, screwed to the control body 14, is actuated, the pawls 10, after a short idle movement, come into engagement with the teeth 11 of the control disc 12, and thus rotate the transmission lever 3. After the termination of the control operation, pedal 1 is brought back into the position of rest by means of a return spring, not shown in the drawings, arranged for example upon the pivot 17. When the manual-control lever 6—7 is actuated, however, though the transmission lever 3 is taken along with it, pedal 1 remains at rest.

As contrasted with the ratchet locking means just described, Figure 3 shows a ratchet locking means such as is employed on motorcycles which are only equipped with a foot-operated control. With this locking means the pawls 10 also remain, in the position of rest of the foot-operated control lever 1, in mesh with the teeth 11 for the control disc 12. This has the result that not only does the pedal 1 take the transmission lever 3 with it when operated, but conversely also the foot-operated control lever 1 is carried along when the transmission lever 3 is actuated.

What I claim is:

1. A gear control for motorcycles, comprising in combination, a manually actuated control including a hand lever adapted to shift the gears in a gear box, a foot-operated control including a pedal actuated lever, a transmission lever interposed between the pedal-actuated lever and the gears, mechanism operatively connecting the hand lever with the said transmission lever, a toothed control disc, pawls normally out of engagement with the teeth of the control disc but meshing therewith when the pedal is depressed.

2. A gear control for motorcycles comprising in combination, a manually operable control including a hand lever adapted to shift the gears in a gear box, a foot-operated control including a pedal actuated lever, a transmission lever interposed between the pedal-actuated lever and the gears, means connecting the hand lever with said transmission lever, and a gear segment marked with the gear ratios associated with said hand lever, adapted to indicate the position of said gears moved in response to said hand lever and said foot operated control.

HERMANN WEBER.